Oct. 25, 1966     L. C. FETEN     3,281,840

MEANS FOR IMPROVING THE DETECTION CAPABILITIES OF AN MTI RADAR

Filed March 24, 1965     7 Sheets-Sheet 1

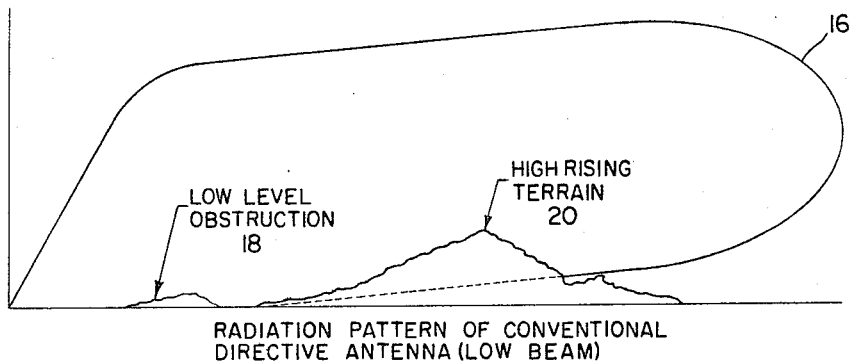

RADIATION PATTERN OF CONVENTIONAL
DIRECTIVE ANTENNA (LOW BEAM)

*Fig. 1*

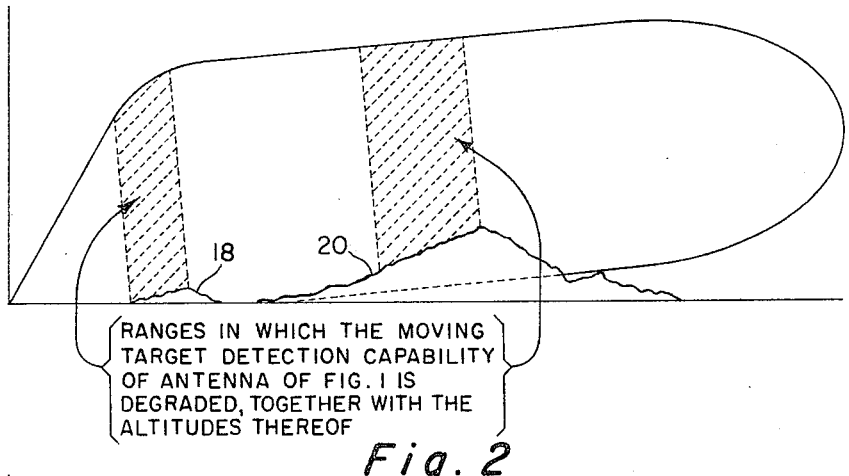

RANGES IN WHICH THE MOVING
TARGET DETECTION CAPABILITY
OF ANTENNA OF FIG. 1 IS
DEGRADED, TOGETHER WITH THE
ALTITUDES THEREOF

*Fig. 2*

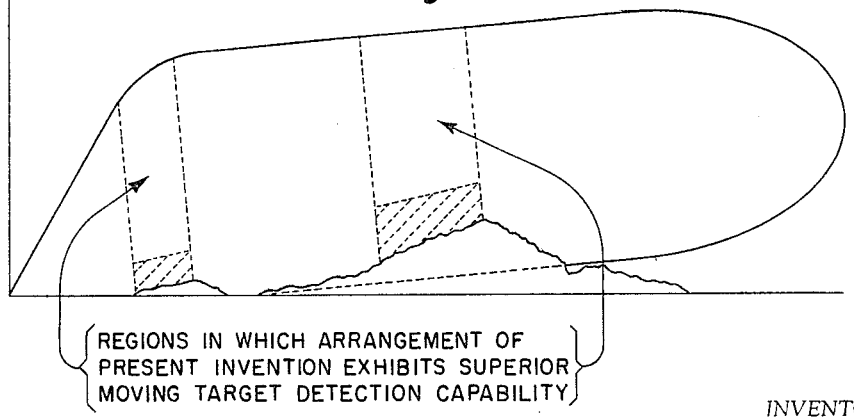

REGIONS IN WHICH ARRANGEMENT OF
PRESENT INVENTION EXHIBITS SUPERIOR
MOVING TARGET DETECTION CAPABILITY

*Fig. 3*

INVENTOR.
LEWIS C. FETEN

BY Howard J. Whitney Jr. AGENT
P. Boxter Warner
ATTORNEY

RADIATION PATTERNS OF MULTIPLE BEAM
ANTENNA OF PRESENT INVENTION

MIDDLE BEAM CONTAINS NO RETURN ENERGY FROM
LOW LEVEL OBSTRUCTION AS IS THE CASE WITH
CONVENTIONAL LOW BEAM ANTENNA OF FIG. 2

UPPER BEAM CONTAINS NO RETURN ENERGY FROM
HIGH RISING TERRAIN AS IS THE CASE WITH
CONVENTIONAL LOW BEAM ANTENNA OF FIG.2
AND THE MIDDLE BEAM OF FIG. 5

PPI DISPLAY OF CONVENTIONAL RADAR SHOWING AREAS IN WHICH UNDESIRED INDICATIONS MAY APPEAR

AZIMUTHAL BLANKING PERIODS OF MIDDLE BEAM HORN OUTPUT

AZIMUTHAL AND RANGE BLANKING PERIODS OF MIDDLE BEAM HORN OUTPUT

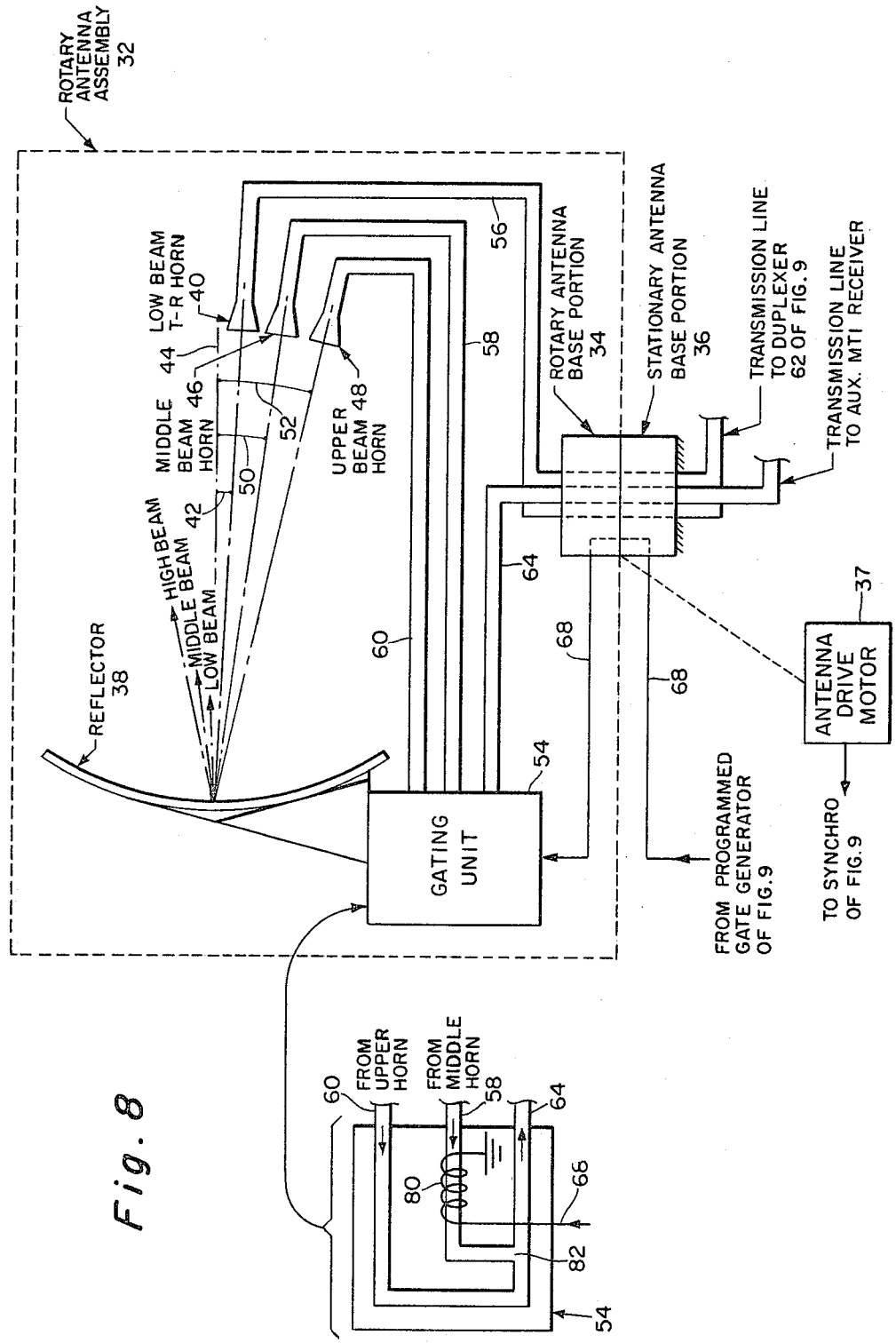

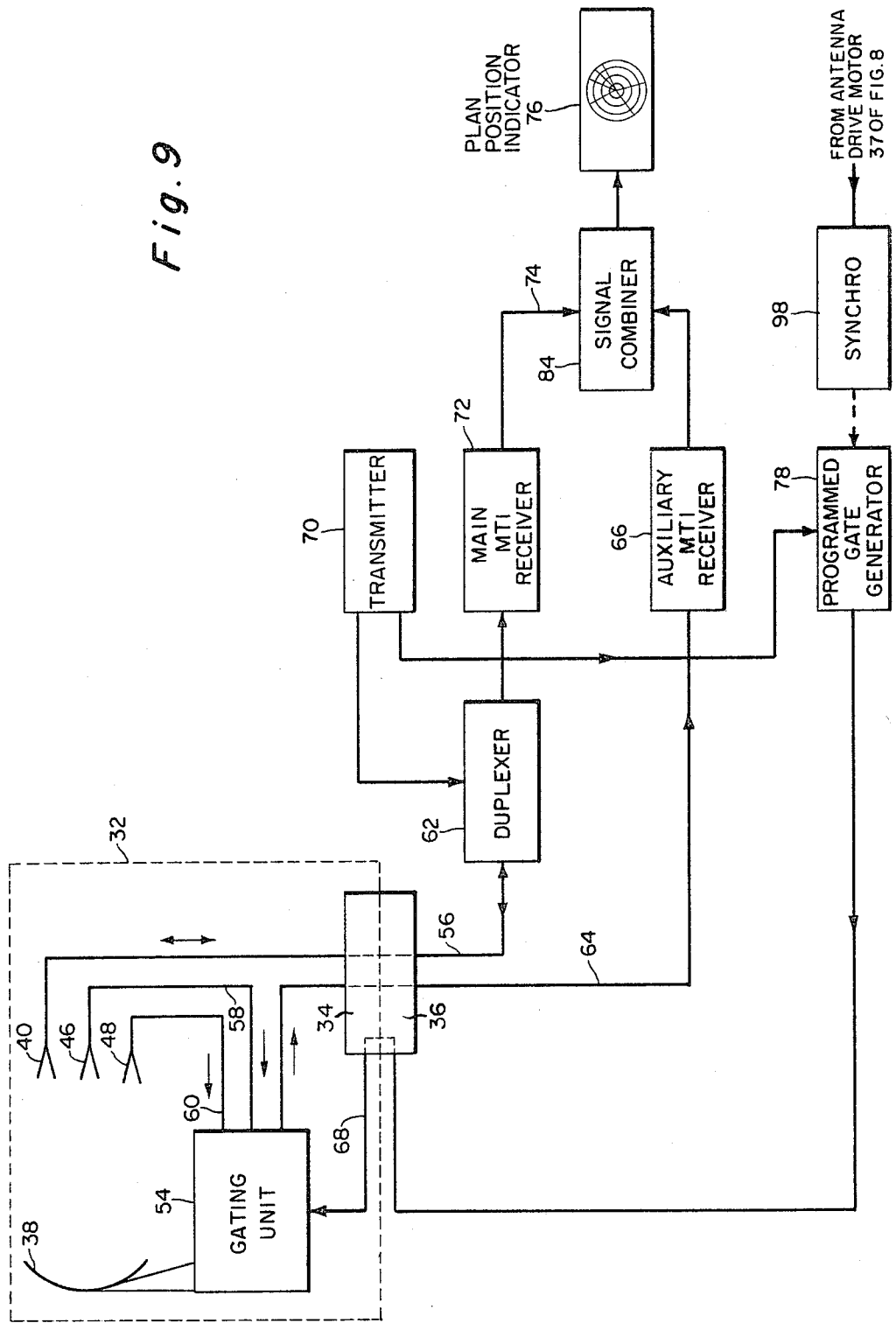

Oct. 25, 1966    L. C. FETEN    3,281,840
MEANS FOR IMPROVING THE DETECTION CAPABILITIES OF AN MTI RADAR
Filed March 24, 1965    7 Sheets-Sheet 7

United States Patent Office 3,281,840
Patented Oct. 25, 1966

3,281,840
MEANS FOR IMPROVING THE DETECTION
CAPABILITIES OF AN MTI RADAR
Lewis C. Feten, Thousand Oaks, Calif., assignor to the
United States of America as represented by the Secretary of the Navy
Filed Mar. 24, 1965, Ser. No. 442,559
7 Claims. (Cl. 343—7.7)

The invention described herein may be manufactured and used by or for the Government of the United States of America for Governmental purposes without the payment of any royalties thereon or therefor.

The present invention relates to radar systems, and more particularly to a system for improving the detection of moving targets such as aircraft in the presence of so-called "ground clutter" or energy reflected from other stationary objects. The invention is adaptable both to military applications as well as commercial operations involving air traffic control.

Systems of the type to which the present invention relates are known as MTI radars, and are concerned with the detection and display of targets having a minimum radial velocity component. Ideally, they eliminate from the display other objects which are fixed in position with respect to the source of transmitted energy. In the latter category fall such items as hills, trees, houses, etc., commonly grouped under the general designation of "ground clutter." Reflections from these objects may be of such amplitude as to mask or obscure the reflections from the desired target, and consequenly render it more difficult of detection.

In the early developmental stages of radar apparatus, the above considerations were of far less importance than they are at present. Formerly, hostile aircraft usually carried out their missions while flying at relatively high altitudes. Under such circumstances, the angle of elevation of the radar antenna was sufficiently great so that relatively little, if any, reflections from objects located on or near the horizon were received. This simplified the detection of a desired target, inasmuch as few if any indications appeared on the radar screen other than those representing the object or objects under investigation.

At the present time, however, enemy aircraft carry out many combat missions in such a manner as to avoid (insofar as may be possible) detection by ground-based radar equipment. This objective is achieved by embarking on a so-called "terrain-following" procedure during which the aircraft remains as close as possible to the ground, rising only a sufficient distance to clear any stationary objects which may be in the path of the aircraft. Very often, such missions require the aircraft pilot to maintain an altitude only a few hundred feet above the surface of the ground. Of course, such missions require the aircraft pilot to have advance knowledge of the terrain sufficiently far ahead so that he can conduct maneuvers within the capability of his craft, but with present surveillance methods this can be readily accomplished.

The employment by hostile aircraft of such tactics, however, greatly increases the difficulty which is experienced in detecting their presence. This is because reflections from the aircraft are mixed in with reflections from the stationary ground objects over which the aircraft are closely flying. Radar equipment in conventional use experiences considerable difficulty in discriminating between indications representing the desired target and those indications resulting from energy returned from such so-called "ground clutter." The radar operator is frequently unable to observe the moving target, especially if the terrain is relatively uneven or has thereon a number of relatively high buildings, trees, etc.

The problem of detecting desired targets under such conditions has been under investigation, and a number of solutions have been heretofore proposed. One of these makes use of the transmission of the radar energy by frequency modulation rather than the successive propagation of individual pulses spaced apart in timed sequence. This process is satisfactory under some conditions, but requires a great deal of complex mechanism as well as being somewhat unreliable in that it does not invariably differentiate between a plurality of targets which are moving at different speeds if the ranges of these targets are such that the respective Doppler frequencies produced by the beating together of the transmitted and received pulses is equal to the variation in transmitter frequency which takes place in a propagation time period equivalent to twice the range difference between any two of the targets. As a result, the radar operator, when viewing the cathode-ray tube screen, experiences great difficulty in identifying not only the characteristics of each individual illuminated area, but also the distance of such area from the point at which the pulses are transmitted.

Another type of system which has been proposed employs a single antenna for both the transmission and reception of pulses, together with a storage device, or delay line, so that two successive signal returns can be subtracted in order to cancel that one which is reflected from a stationary object. This arrangement, however, is utilized primarily on moving aircraft, and a modification thereof makes use of a pair of antennas mounted a predetermined distance apart, this separation distance being chosen equal to that traveled by the airplane between the transmission of successive pulses. After the first antenna has transmitted and received a pulse, the second antenna transmits and receives another pulse, which, due to the movement of the airplane, occurs at the same point in space. The result is that improved cancellation of spurious energy can be expected when the second pulse is subtracted from that first transmitted.

In all of the above-discussed arrangements, the basic principle involved is that, when a radiated pulse strikes a reflecting object such as an airplane, it is returned to the radar where is is received and amplified to produce a bright spot or "pip" on the radar screen. The radial location of this pulse on the screen depends upon the length of time required for the pulse to travel to the reflecting object and then return to the point of origin. This time interval is a function of the distance of the object from the radar and is readily determinable. Also, since the antenna is cyclically scanning the horizon, the angular position of the bright spot or "pip" yields information as to the location of the object in terms of azimuth. This is because the antenna scans the entire horizon in cyclic fashion, so that during each such scan all reflecting objects within the range of the equipment are shown on the cathode-ray tube screen. Owing to the persistence to the screen phosphor and the repetition of the scanning action, all such identified objects remain visible to the radar operator throughout the period during which the apparatus is in operation.

The radar receiver of the present invention utilizes the basic phase-discriminating technique of conventional MTI receivers with a novel form of antenna construction that creates a plurality of vertically-offset radiation patterns each of which is identified with a specific spatial region. Furthermore, the circuitry of the herein described system precludes the generation of an excessively high bias while at the same time precludes vectorially adding the target signal to the background energy so that the phase shift does not become small. In order to yield such results, the combined transmitting and receiving antenna of the radar is designed to incorporate three so-called "feed horns." These horns are so arranged that two such elements are employed solely for receiving energy reflected back from any intercepting objects, while the third horn is designed both as a transmitter and receiver. Because these three members are positionally offset from one another, the direction from which reflected waves are received is different in all three cases, even though they make use of a common parabolic reflecting element or "dish" from which the generated waves are sent out in the general direction of a target. The horn which acts both as the transmitter and a receiver is positioned closest to the exact focal point of the reflector, and establishes a conventional cosecant squared radiation pattern. The remaining two feed horns, which are solely for receiving, lie vertically below this main feed horn, and are positionally displaced by an amount proportional to the desired displacement of their respective radiation patterns. The result is that three patterns are created representing different areas from which energy is received, and these three patterns, although overlapping, nevertheless cover different low angle spatial regions. As a result of this physical arrangment of the horns, spurious signals which originate in a region covered by but one of the horns will only be received by that particular horn and will not appear in any energy returned to the other two horns. As a result of this action and that of a unique gating network employed in conjunction with the antenna operating mechanism, the total received "clutter" is cut down by a material degree compared to that which would be present if a single horn were employed as in conventional equipment. The overall efficiency of operation of the radar is therefore greatly improved, since echos from certain stationary objects lying on or only slightly above the ground level may appear within the lowermost radiation pattern, these echos from low lying stationary objects will be reduced or appear in that pattern which lies intermediately above this lowermost pattern. In the same fashion, signals from fairly high hills and buildings of extreme height, while intercepting energy in the intermediate pattern area, are reduced or not present in the uppermost pattern area. This latter spatial region is almost entirely free of any spurious objects which could result in reflections being created which are intercepted by the radar transmitter to produce the unwanted display.

One object of the present invention, therefore, is to provide an improved radar system of the type designed to detect moving objects which possess a radial slant range equal to particular stationary objects.

A further object of the invention is to provide an improved form of radar apparatus particularly designed to detect aircraft engaged in missions of the type which include closely following the terrain over which the aircraft is flying.

An additional object of the invention is to provide a radar system of the type in which spurious reflections from known stationary objects result in a less pronounced effect on the visibility of the moving target.

A still further object of the inventioin is to provide a radar scanning antenna in which a plurality of pickup elements are disposed in positional displacement with respect to one another, such elements respectively acting to intercept energy reflected to such antenna from objects located within a number of different spatial zones, at least one of such zones containing a moving target as to which positional data is desired, the zones as a whole including one or more objects of a stationary character from which reflections are unwanted and only serve to obscure desired information in the display.

An additional object of the invention is to provide, in a radar of the type described, means for selectively gating data received by the radar in such fashion that reflections from stationary objects are inhibited in their passage through the radar circuitry and only those signals freely processed which represent data from a target concerning which information is sought.

Other objects, advantages, and novel features of the invention will become apparent from the following detailed description of the invention when considered in conjunction with the accompanying drawing, wherein:

FIG. 1 is a radiation pattern such as might be developed by a radar antenna of known design when such antenna is directed so as to investigate objects close to the surface of the ground;

FIG. 2 is a showing of the manner in which reflections from the stationary obstructions illustrated in FIG. 1 serve to degrade the radar return in the ranges occupied thereby, rendering detection of a moving target within these ranges either difficult, or, in many cases, impossible;

FIG. 3 is an illustration along the lines of FIGS. 1 and 2 of a directional radiation pattern, showing the areas, bordered by the broken lines, in which the radar described herein will exhibit superior moving target detection capabilities as compared to conventional radars;

FIG. 8 is a preferred antenna arrangement for developing the three radiation patterns illustrated in FIG. 4 of the drawings, the arrangement of FIG. 8 including a plurality of horns displaced from one another in a vertical direction, also indicating the manner in which energy is conducted from the individual antenna horns to the main portion of the radar system;

FIG. 9 is a somewhat schematic showing of a radar receiving system adapted to process the signals picked up by the individual antenna horns of FIG. 8;

Figure 5:
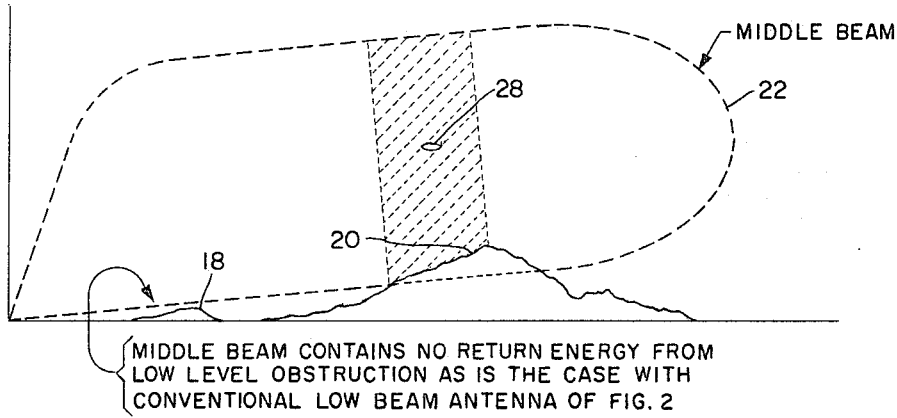
FIG. 5 is a radiation pattern of one of the beams generated by the radar of the present disclosure, indicating the manner in which it discriminates against energy returned from objects or obstructions having a relatively low altitude, such energy return being entirely lacking in the illustrated pattern.
Figure 6:
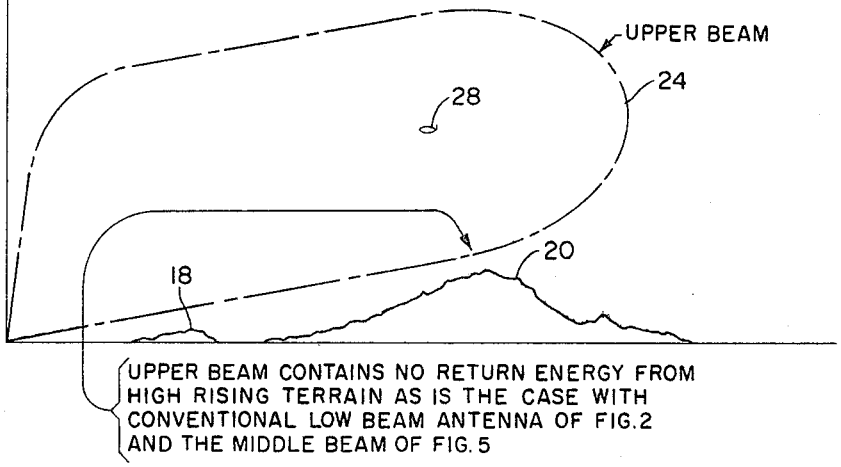
FIG. 6 illustrates the upper beam radiation pattern of FIG. 4, showing the manner in which this beam discriminates not only against energy returned from low-altitude stationary objects or obstructions, but also from objects having a much higher elevation, energy from both such obstructions being entirely lacking in the pattern illustrated.
Figure 7:
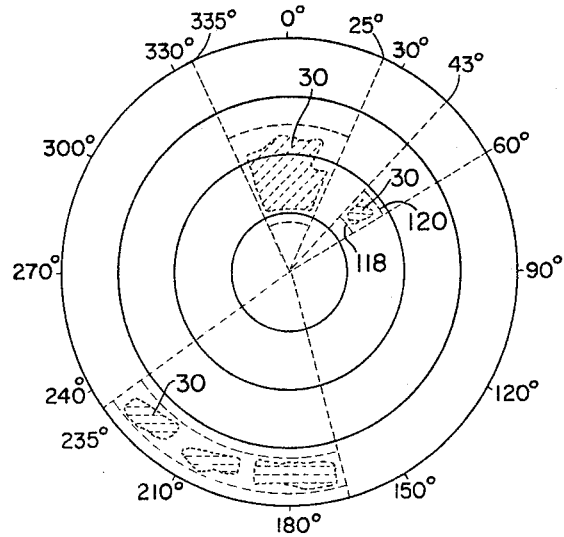
FIG. 7 is a polar diagram of a radar plan position indicator of conventional design when the antenna is oriented to encompass a spatial region such as shown in FIG. 1, this region including both low-altitude and high-altitude objects from which reflection can adversely affect moving target detection by conventional radar, such spurious target returns being shown in FIG. 7 by the shaded areas.
Figure 13:
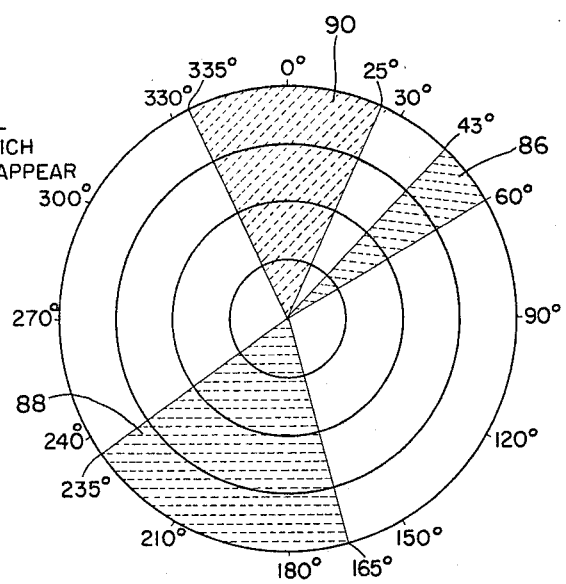
Figure 14:
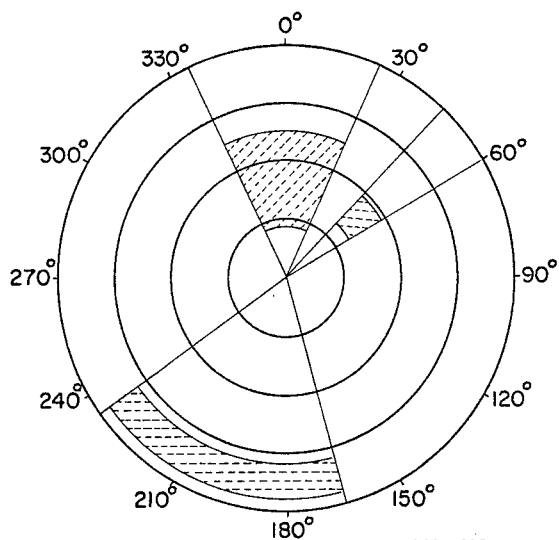
Figure 11:
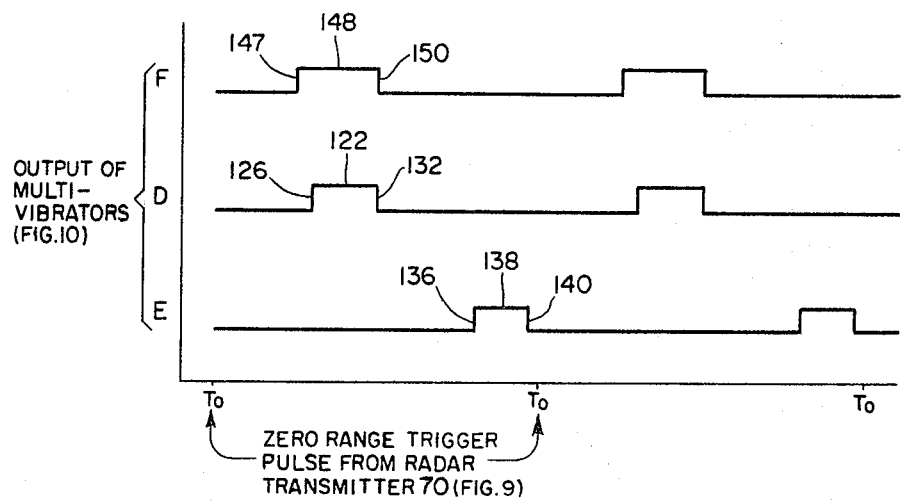
FIG. 11 is a set of waveforms which are helpful in understanding the operation of certain components included in the circuit of FIG. 10.

FIG. 13 is a polar diagram somewhat along the lines of that shown in FIG. 7, illustrating the manner in which certain azimuthal sectors are blanked by the circuitry of FIG. 9 as the antenna of FIG. 8 cyclically scans the horizon, such sectors when blanked during coincidence with the range pulses of FIG. 11 completely eliminating the effect of energy reflections picked up by the middle-beam horn which represent unwanted objects; and FIG. 14 is a further polar diagram drawn on the lines of FIG. 13, bringing out the manner in which the gating components of FIG. 9 have acted to eliminate from the radar middle beam only all signals received within the particular ranges in which the stationary objects shown in FIGS. 1 through 6 appear.

FIG. 1 of the drawings illustrates a typical radiation pattern as might be produced by a radar now known in the art, when the objective thereof is to obtain information as to the presence of moving targets relatively close to the horizon. Such targets, for example, may be low-flying aircraft engaged upon a terrain-following mission. In order to provide maximum detection capabilities under such conditions, the directivity pattern of the radar is chosen to intercept all objects the altitude of which is at a minimum with respect to the surface of the ground. However, in order to detect desired targets under these conditions, conventional radars must necessarily pick up reflections from other objects lying within the region scanned by the radar antenna. As brought out in FIG. 1, the conventional radiation pattern, identified by the reference numeral 16, covers a spatial region during each azimuthal scanning level obstruction 18 at a certain range from the radar, as well as a higher obstruction 20 at a more extended range. Both the obstructions 18 and 20 are illustrated as variations in the terrain, such as hills or mountains, although it will be recognized that man-made objects, such as buildings, may result in a similar interception of the energy radiated from the radar antenna.

When a conventional radar operates under conditions such as exemplified in FIG. 1, the capability of the radar to detect a desired moving target may be seriously impaired or degraded in the regions having slant ranges generally corresponding to those of the fixed obstructions. In other words, reflections from such obstructions when received by the radar tend to develop a bias which decreases the receiver sensitivity insofar as the desired target is concerned.

FIG. 2 of the drawings shows by means of shaded areas, those particular spatial regions in which the moving target detection capability of a conventional radar is impaired when so-called "ground clutter" of the nature described is present.

FIG. 3 brings out representative spatial regions in which the present invention operates to yield improved results as compared to those obtained in a standard surveillance system of the type described above. As will be noted in FIGURE 3, the spatial regions delineated by the broken lines are of greatly reduced extend insofar as the shaded areas are concerned, those regional portions in which the shading is no longer present being covered by the radar herein disclosed even though the obstructions 18 and 20 are still present and continue to reflect energy back to the point from which it emanated.

Figure 4:
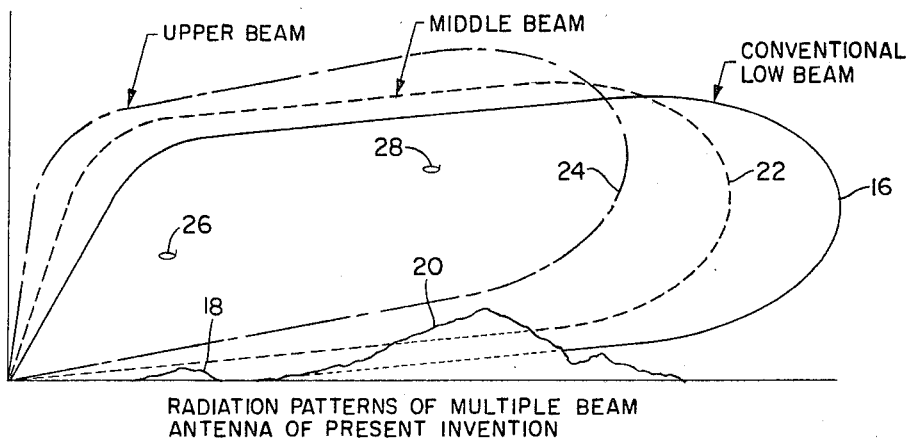
FIG. 4 is a representation of multiple-beam antenna radiation patterns such as might be produced by the radar system described in the present disclosure.

FIG. 4 illustrates the basic principles of applicant's concept insofar as they are directed to the development of a plurality of separate radiation patterns covering different spatial regions and produced by a radar antenna having a number of individual energizable members displaced from one another in a given direction. These separate radiation patterns are offset so as to be in effect "tilted" in a vertical direction. As shown by the areas lying within the broken lines, the lowermost spatial region associated with the designated low beam is that of a conventional radar apparatus the pattern of which is represented by FIG. 1 of the drawings.

The present invention, however, makes use of further radiation patterns respectively identified by the reference numerals 22 and 24, the former designating a spatial region vertically displaced from the conventional pattern illustrated in FIG. 1. It will be appreciated from an inspection of FIG. 4 that the radiation pattern 22 has a lower boundary which is of sufficient altitude to clear the low-lying obstruction 18, so that as a result there is no energy reflected back therefrom to interfere with the detection of a desired target, such as an aircraft 26 which may be within a range generally identical to that of obstruction 18 and which aircraft consequently would conventionally be obscured or masked by such unwanted reflections. In the same fashion, FIGURE 4 illustrates a third radiation pattern 24 positionally distinct from the two first-mentioned patterns and having a lower boundary which forms an angle with the horizon sufficient to clear the high obstruction 20. This renders the radar more likely to detect any moving target (such as a further aircraft 28) which might be within the same range as the obstruction 20 at some period of time and thus be rendered difficult of detection by the radar if the latter employed only the conventional low beam discussed in connection with FIG. 1.

FIG. 5 is a showing of the manner in which the so-called "middle" beam of applicant's herein-described radar system has a directivity pattern such that it does not strike stationary objects which are of an altitude lower than the boundary of the spatial region covered by such beam. When the angle made by the beam 22 is sufficient to avoid the low-level obstruction 18 of FIG. 1, then the beam will contain no return energy therefrom as would be the case with a conventional arrangement, as brought out in FIG. 2 of the drawings. However, this middle beam 22 *does* contain reflections from the high-rising obstruction 20, so that the aircraft 28 is difficult to detect when it is flying within the same range as this high-altitude obstruction. It is to improve the detection capabilities of the radar within this latter region that applicant's concept includes the development of the still further radiation pattern 24.

FIG. 6 brings out the manner in which this additional radiation pattern 24 increases the operating efficiency of the radar by providing a radiation pattern in which no return energy is received except that representative of the desired moving target 28. In this showing of FIG. 6, the spurious return from the obstruction 20 is completely eliminated, along with that from the obstruction 18. It is a feature of the concept that the three individual "beams" shown in FIG. 4 are separately received and combined in a unique manner such that the radar possesses an increased ability to pickout and distinguish a desired target despite the presence of stationary objects such as the terrain variations 18 and 20.

When a conventional radar having a single radiation pattern of the type illustrated in FIG. 1 is utilized, reflections from low-lying objects (as brought out in FIG. 2) may combine vectorially with the moving target return so that the resultant signal phase shift from the moving target becomes very small, and thus the moving target indication becomes very weak. It will be apparent that when a moving target the detection and/or tracking of which is desired coincides in both azimuth and range with such a spurious signal return, then the presence of the moving target will be difficult if not impossible to detect. As a consequence, the capability of the radar under such circumstances is seriously degraded.

FIG. 8 illustrates a preferred embodiment of an antenna unit designed in accordance with the basic principles of the invention. This unit, generally identified by the reference numeral 32, includes a number of components found in standard moving target indicator systems now in operation. It is intended to rotate about a vertical axis and to cyclically scan a region in space with the objective of acquiring and/or tracking a moving target lying within the radiation pattern of the equipment. In a more or less standard fashion, antenna assembly 32 possesses a rotary base portion 34 on which the movable portions of the antenna are carried, this rotary base portion 34 being associated with a stationary base portion 36 upon which the former is mounted, these base members 34 and 36 being schematically shown in the drawing since the physical construction thereof forms no part of the present invention. It is only necessary that the associated portions 34 and 36 be so designed as to include means for carrying therethrough a pair of transmission lines and an electrical conductor in such fashion that these members maintain their relationship as the antenna unit 32 cyclically rotates on the stationary base 36 when mechanically driven by the motor 37.

Included in the rotary antenna unit 32 is a standard hemispherical reflector, or "dish," 38 oriented to reflect in a generally horizontal direction energy impinging upon the inner surface thereof from an energizable element 40, this component, in the embodiment shown in FIG. 8, consisting of a horn with its axis directed to the focal point of the reflecting element 38. As will later appear, it is necessary that the axis of the horn 40 form an angle 42 with the horizontal axis 44 of the reflector unit 38. Consequently, when the horn 40 is energized in a manner which will later be described, the energy propagated by the reflector 38 will be at an angle to the horizon such as to form the so-called "low-beam" radiation pattern 16 of FIGS. 1 and 4 of the drawings. This horn 40 corresponds to the conventional energizable element of standard radar systems, and is capable of being periodically energized to develop a series of outgoing pulses which are time-spaced in the usual manner. The horn 40 also is adapted to receive energy reflected back to the antenna unit 32 from objects lying within the pattern of FIGS. 1 and 4, these reflections including energy intercepted by obstructions such as those identified by the reference numerals 18 and 20. These reflections act to produce the undesired effect and thus degrade the performance of the radar.

To overcome this serious deficiency in systems employing only a single horn such as that shown as 40 in FIG. 8, the present invention utilizes a pair of additional horns 46 and 48 which offset from the horn 40 in a vertical direction. That is, the horn 46 forms an angle 50 with the axis 44 of the reflector 38 which is greater than the angle 42 formed by the horn 40, while the horn 48 forms an angle 52 with the axis 44 of the reflector which is greater than the angle 50. In consequence of this arrangement, the horn 46 receives energy reflected back from a region in space delineated by the so-called "middle beam" radiation pattern 22 of FIG. 4, while the horn 48 (which may be designated as the "upper beam" horn) covers a region having boundaries illustrated by the radiation pattern 24 of FIG. 4. It will be apparent that the angular offsetting of the individual radiation patterns of this antenna system are a direct function of the distance by which the horns 40, 46 and 48 are vertically displaced from one another, or, in other words, by the magnitude of their respective angles 42, 50 and 52. It will be obvious that these angles can be so chosen as to "tilt" the radiation patterns of FIG. 4 by any desired amount and thus predetermine the location of these patterns in such a manner as to avoid stationary obstructions of any altitude and/or variations in the terrain over which the radar is operating. It will subsequently be brought out that the horn 40 acts both as a transmitter and a receiver of energy, while the horns 46 and 48 only pick up energy reflected back to the antenna 32 from objects within their respective patterns. As brought out by FIG. 9, it is a feature of the present concept that energy picked up by the horns 46 and 48 is processed separately from that picked up by the horn 40, and that, in addition, the output of the so-called middle-beam horn 46 is periodically gated so as to close this path during time periods when reflections from stationary objects appear therein. The manner in which such gating is brought about will be fully set forth in connection with a description of FIG. 9 of the drawings.

Although the structural features of the antenna assembly of FIG. 8 form no part of the present invention, nevertheless it will be recognized from the drawings that the reflector 38 is mounted for rotary movement and thus is integrally associated with the rotary antenna base portion 34. One design combines the reflector 38 with a gating network 54 upon which the antenna reflector 38 is shown as being mounted, the network 54 being arranged to rotate with the reflector as a unit. This network 54, although shown schematically, is preferably of the solid-state type the conductional characteristics of which are controllable by the application thereto of a voltage pulse of suitable polarity.

The three feed horns 40, 46 and 48 are each supported by an elongated waveguide of which they act as an electrical termination, these waveguides being designated by the reference numerals 56, 58 and 60, respectively. The latter two waveguides conduct returned energy from the reflector 38 to the gating unit 54, while the waveguide 56 conducts energy in bidirectional fashion to and from a duplexing unit 62 (FIG. 9) the operation of which will be subsequently described. The waveguide 56 thus acts as a transmission line and is arranged to pass through both the rotary antenna base portion 34 and the adjacent stationary antenna base portion 36, between which some suitable form of rotary joint (not shown) is located. A further waveguide 64 leads from the gating unit 54 and passes through the respective antenna base portions 34 and 36 such that it possesses a co-axial relationship with the waveguide 56. The only requirement for the waveguides 56 and 64 in passing through the associated antenna base portions 34 and 36 is that the energies respectively conducted thereby encounter no appreciable discontinuity which would create objectionable standing waves within either of the waveguides. The guide 64, after emerging from the stationary base portion 36, leads to a further unit 66 of the receiving system of FIG. 9.

Also leading to the gating unit 54 is an electrical conductor 68 from a still further component of the radar system of FIG. 9. This conductor 38 passes through the associated antenna base portions 34 and 36 and is maintained in constant conductive status by means of a conventional slipring (not shown) or some other standard means for use in rotary devices of this nature. It should be emphasized that the structural characteristics of the base portions 34 and 36 may be chosen in accordance with the environmental conditions encountered, and do not form any part of applicant's concept.

In order to understand the principles upon which the present concept is based, it is necessary to take into account the variations in reflected energy which occur in the different spatial regions with which the present invention is concerned, this being exemplified by the showings of FIGS. 4 through 6. In these figures, it is brought out that the radar system of the present invention utilizes a plurality of antenna elements which are respectively energized by reflections from objects lying within different regions scanned by the radar antenna. Certain of these regions are more susceptible to interference from stationary objects than are others, and as a consequence it is an objective of the present disclosure to minimize the effect of these spurious signals and to produce a display for the radar operator in which an indication from a desired target is readily discernible even though this target may lie within a range which is substantially the same as that of a stationary obstruction.

In order to achieve this objective, energy received by the three horns 40, 46 and 48 of FIG. 8 is processed in a unique manner by the apparatus of FIG. 9. It has been stated above that the transmission line 56 (to which the horn 40 is connected) leads to a duplexer 62, this duplexer being a standard T-R unit adapted to pass therethrough timed pulses from a transmitter 70. The duplexer 62, in conventional fashion, also receives return pulses picked up by the horn 40 after they have been reflected from some object toward which the antenna unit 32 is directed during each cyclic scan. Such received pulses are conducted through the waveguide 56 where they pass through the duplexer 62 and are applied to a main MTI receiving unit 72. The latter may be entirely conventional in design, and yields an output signal in the conductor 74 which contains information as to the presence of objects within the spatial region defined by the radiation pattern 16 of FIG. 4. This data present in the signal output of the MTI receiver 72 may be degraded by the inclusion therein of spurious signals from the terrain variations 18 and 20, and consequently does not permit a radar operator to clearly observe some moving target having a similar range, such a target being exemplified by the aircraft 28. In accordance with the present concept, additional information is supplied to the PPI indicating device (designated in FIG. 9 by the reference numeral 76), this indicating device having a screen on which the various indications are displayed in a manner such as brought out in FIG. 7 of the drawings.

It has been brought out during a discussion of FIGS. 4 through 6 of the drawings that the radiation pattern 24 of the so-called upper feed horn 48 is sufficiently tilted (or, in other words, forms a large enough angle with the horizon) so that no reflections from stationary objects appear therein to be picked up by the horn. Only reflections from desired targets, such as the aircrafts 26 and 28, will produce indications on the PPI scope 76, and these indications are not in any way impaired or degraded so as to render target detection difficult.

Because of this characteristic of the horn 48, energy therefrom is conducted over the wave guide 60 to the gating unit 54, and such energy passes through this gating unit without interruption. A detailed view of such unit, illustrating the inner arrangement thereof, is shown in FIG. 8 as a supplement to the block diagram to more clearly bring out the manner in which energy from horn 48 is conducted through the gating unit and combined with energy picked up by the horn 46. However, the action of the horn 46 is unique in that the output thereof is selectively gated to preclude passage of energy picked up by this horn during intervals of time when reflections are being received from obstructions or other unwanted objects lying within the radiation pattern 22. During those time periods when unwanted energy is being thus picked up, means are provided in accordance with the present concept for precluding application to the receiver of FIG. 9 of energy representing such unwanted objects, and, as a result of this action, precluding application of unwanted energy to the receiver phase detector.

Such gating action is developed by a so-called programmed gate generator, which is designated in FIG. 9 of the drawings by the reference numeral 78. This unit will be described as to its operating details hereinafter, but at the present point it is only necessary to recognize that the output thereof is in the form of control pulses which are applied over the conductor 68 through the antenna base portions 34 and 36 to the gating unit 54. These control pulses from the generator 78 flow through a coil 80 encircling the waveguide 58 and have the effect of terminating, during the duration of each pulse, the flow of signal energy through this waveguide which leads to the gating unit 54 from the so-called "middle beam" horn 46. Although this explanation is simplified for the sake of illustration, it will be recognized that a solid-state switch would normally be employed for the purpose. As shown in the detailed illustration of the gating unit 54, the respective energies flowing through the waveguides 58 and 60 are combined at the junction 82, from which point they flow through the output waveguide 64 to auxiliary MTI receiver 66 of FIG. 9. It will now be recognized that the output of the horn 40 is processed by the main MTI receiver 70 independently of the combined energies picked up by the "upper" and "middle" beam horns 48 and 46, respectively, the outputs of these latter two horns being combined in the gating unit 54 and the resultant output supplied to the auxiliary MTI receiver 66. As shown in FIG. 9, the signal produced by the auxiliary MTI receiver 66 is fed to the signal combiner 84, which also receives the output of the main MTI receiver 72. The PPI scope 76 consequently has applied thereto both the output of receiver 72, representing the reflections picked up from within the region embraced by the radiation pattern 16, and also those reflections picked up by the horns 46 and 48 from other spatial regions respectively embraced by the radiation patterns 22 and 24. Since the returned energy received by the horn 46 may, however, contain spurious signals (such as reflections from the obstruction 20 in FIG. 5) the present concept incorporates means for precluding passage to the MTI receiver of energy received during those particular time intervals when such unwanted reflections are present. Due to this unique mode of operation, the auxiliary MTI receiver has eliminated therefrom the effects of such spurious signals or other reflections from "ground clutter".

In order to achieve this objective, however, it is necessary that the location and physical characteristics of this "clutter" be determined in advance, so that the radar gate generator 78 (to be described in detail in connection with FIG. 10 of the drawings) can be programmed to gate the incoming signals at those particular time instants when the spurious reflections are being received. In other words, it is necessary to "set up" the radar at any particular location so as to ascertain the presence of such obstructions or terrain variations, and to select suitable operating components in accordance with the respective ranges of such obstructions from the point at which the radar antenna is set up. The "pre-programming" thus required is only with respect to the azimuthal aspects of these obstructions, since other provisions are provided for taking into account their range characteristics. The latter may be compensated for by manual adjustment of certain components of the system as hereinafter described, and this can be carried out by the radar operator while he is viewing a desired moving target on the screen of the PPI indicator. It is only in very unusual circumstances that such provisions will fail to eliminate the effects of spurious reflections to a material degree, and in a majority of cases the unwanted indications can be almost completely canceled out.

It will now be recognized that the middle beam of applicant's antenna arrangement contains unwanted reflections from such stationary objects as the terrain variations 18 and 20 of FIG. 4. It is desirable, therefore, to gate or interrupt the reception of energy by the horn 46 from this spatial region during those time periods when such unwanted energy is present. From FIGS. 8 and 9 it will be seen that the signals from this middle beam horn 46 are combined in the unit 54 with energy picked up by the upper beam horn 48. The signals thus added together at the waveguide junction 82 are applied to the auxiliary MTI receiver 66 through the common wave guide or transmission line 64 so that, when such reflections seriously interfere with energy reflected from the desired target which is picked up by the upper beam horn 48. In accordance with a principal feature of the present concept, the energy present in the wave guide 58 is periodically interrupted at predetermined intervals *before* it reaches the output waveguide 64. This is accomplished by applying voltage pulses to the coil 80 over the conductor 68 from the generator 78 of FIG. 9. As shown in the drawing, this coil 80 encircles the waveguide 58 and, in a known manner, functions to block the passage of energy through the wave guide when an electromagnetic field is created therearound. This field penetrates the waveguide and precludes conduction of the signals picked up by horn 46 to the output waveguide 64 during the time interval of a pulse from the generator 78. As a consequence, when the latter produces a pulse in the conductor 68, only energy from the waveguide 60 passes through the gating unit 54 to the auxiliary MTI receiver 66, and such energy is not diluted or degenerated by having added thereto spurious signals from the middle beam horn 46.

Before proceeding with a detailed description of the generation and application of these so-called, blocking pulses, however, it might be helpful to recall that radar systems of the type with which the present concept is concerned operate on the basic principle of detecting a moving target by sensing the phase of the reflection produced thereby as compared to that of the outgoing pulse. In the case of reflections from a moving target, this phase varies, while energy returned from a stationary object possesses a constant phase relationship. An MTI radar system consequently operates by sensing this variable phase of the moving target returns and acts to separate such energy from the constant-phase return from a fixed object. However, in conventional MTI radars, stationary objects of considerable dimensions can develop a signal in the radar receiver which is of high amplitude. Such strong spurious signals can obscure the relatively weaker return from a desired target, since the output of the receiver is produced by the vector addition of all of the signal energy picked up by the antenna. Still further, strong spurious reflections, when passing through the receiver, develop a bias which is effective to materially reduce the sensitivity of the receiver to the target signal itself. Although it has been recognized that some means for discriminating between the two types of signal returns is desired in order to increase the capabilities of the radar receiver, nevertheless this has not been feasible up to the present time due to the fact that both target returns and spurious reflections have been conventionally detected and demodulated in a single channel. This procedure precluded the separation of the unwanted signals in the receiving apparatus prior to the application of the received indications to the receiver phase detector. The concept herein disclosed provides a separate channel which includes the auxiliary receiver 66 of FIG. 9 to process energy received from one or more particular spatial regions independently of energy from a different spatial region that is processed by a further MTI receiver corresponding to that now employed in the art. This auxiliary MTI receiver of the present disclosure does not have its sensitivity reduced by spurious signals since, due to the novel arrangement of the antenna per se the energy returned from certain low-lying objects is not present in the input to such receiver. Furthermore, spurious signals from other objects of higher elevation, although picked up by the antenna, are precluded from reaching the receiver as a result of the gating action of the unit 54 of FIG. 9, this gating action resulting from operation of the generator 78.

In order to thus preclude passage of energy to the auxiliary MTI receiver 66 of FIG. 9, it is necessary to block the waveguide 58 during those time intervals when reflections are being picked up from stationary objects by the middle beam horn 46. As shown in FIG. 4, these intervals include the time periods when a reflection is being received by the antenna 32 from the terrain variation 20. Consequently, it is a requirement that this gating action be correlated with the cyclic horizontal rotation of the antenna 32 as well as tied in with the range of the obstruction, or, in other words, its distance from the radar equipment. Since the efficiency of the disclosed system depends on the operation of this gating apparatus, its output must be controlled in order to prevent reflections from the desired target from being blanked out along with the unwanted energy variations.

Figure 10:
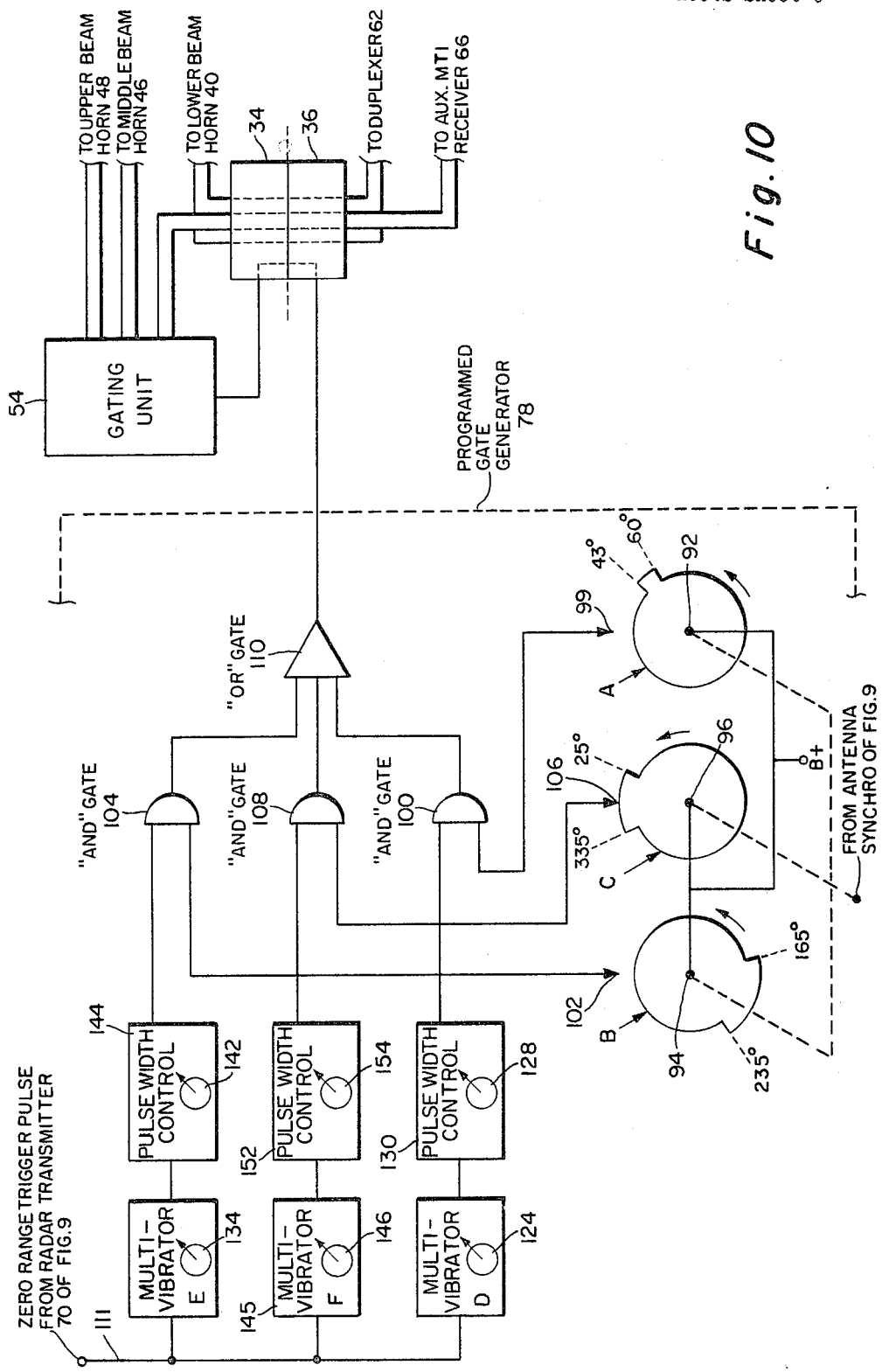
FIG. 10 is a partially schematic illustration of one of the components of FIG. 9, also showing the manner in which a rotation of the antenna of FIG. 8 is synchronized with the processing of the signal data derived from the horn elements of the latter figure.

In order to clearly illustrate the manner in which the circuit of FIG. 10 is effective to blank out undesired energy reflections in the receiver input circuit, let it be assumed that the equipment of the system herein described be installed in such a location that a plurality of spurious returns are picked up by the antenna. These energy returns produce illuminated areas (designated by the reference numeral 30) on the screen of the cathode-ray tube, each such area lying in a position which may be represented by (1) its angular location with respect to a fixed reference point, and (2) by its radial distance from the center of the screen. The former is indicative of the azimuthal characteristic of each such illumination, while the latter is representative of its range or distance from the antenna 32. In order to eliminate these undesired signals in the receiver input circuitry, and at the same time not blank out other areas which may contain a target indication, the gating action of the unit 54 must not extend beyond a time interval when the cathode-ray beam of the tube is sweeping across the area where an undesired presentation appears. It is to produce such a blanking voltage variation that the network shown in FIG. 10 of the drawings was specifically developed.

This circuit of FIG. 10 of the drawing is arranged to develop one or more blanking pulses for application to the unit 54 of FIGS. 8 and 9. It will be recognized that the number of such blanking pulses thus required is dependent upon the number of regions of the PPI display created by reflections from stationary objects lying within the spatial region covered by the radar system. Inasmuch as three such areas have been chosen for illustration in FIG. 7, a similar number of pulse-generating devices are illustrated in FIG. 10, although it will be again emphasized that there is no necessary limitation on the number of such devices that may be utilized.

Referring to FIG. 7 of the drawings, it will be seen one of these illuminated regions 30 lies within an area of the presentation having an azimuthal location from the rotary antenna 32 bounded by vectors representing 43° and 60°, considered from the zero reference point shown. In order to eliminate the effect of this illuminated area 30, the energy picked up by the middle horn 46 should be blocked and precluded from reaching the auxiliary MTI receiver 66 during a portion of each azimuthal scan represented by the shaded area 86 in FIG. 13. In similar fashion, a further illuminated area lies in a region of FIG. 7 bounded by the vectors representing 165° and 235° of scan. The last one of the exemplary indications 30 is bounded by the further vectors 335° and 25°, this region embracing the zero reference point from which the vectors are measured. FIG. 13 consequently brings out the *azimuthal* sectors within such stationary obstructions appear, and thus show those time portions of each scanning cycle during which the gating circuit 54 must be effective with respect to the *direction* from which the unwanted reflections are received. However, it is also necessary to take into account the *range* at which these obstructions appear, as otherwise the effect of the blanking or gating action would be effective over the entire radial distance from the center of the cathode-ray tube screen out to the periphery thereof and thus possibly obscure a desired target indication which lies outside of one of the areas 30 of FIG. 7. This range aspect of the blanking action is tied in with the cyclic generation of the range trigger pulses which are synchronized with the operation of the transmitter 70 of FIG. 9, and which coincide in time with the propagation of pulses from the low beam horn 40 of FIGS. 8 and 9.

The circuit of FIG. 10 is arranged to develop blanking pulses which are effective only during the time periods when the scanning beam of the PPI indicator 76 of FIG. 9 is traversing areas of the display in which the undesired indications 30 of FIG. 7 are effective. It is composed of two basic portions one of which is associated with the azimuthal aspects of each blanking pulse and the other of which is concerned with the range characteristics of such pulses. To effect such a mode of operation, the apparatus of the drawing is designed to incorporate a plurality of pulse channels equal in number to the areas to be blanked. Since the example of FIG. 7 contains three such areas 30, there are three pulse-producing channels set forth in FIG. 10. Initially, the description will be concerned with the manner in which the azimuthal blanking aspects of these pulses are determined and then generated.

When the radar system is initially set up at a chosen site, it is operated to ascertain the number and nature of any stationary objects or terrain variations which may be present within the capabilities of the equipment. In the example being given, it has been assumed that three such obstructions are present which yield the spurious fixed target regions 30 of FIG. 7, and it is the principal objective of applicant's concept to eliminate or materially reduce the effect of such indications on the display screen. Accordingly, the radar operator, in carrying out the initial "setting up" of the equipment, notices the presence of these three obstructions or stationary objects which produce the indications 30. He then makes note of the azimuthal limits which bound such obstructions, and, in the example of FIG. 7, one such obstruction 30 lies between the vector corresponding to 43° of scan and the vector representing 60° of scan. The second obstruction lies between corresponding vectors respectively representing 165° and 235° of scan. The third and last obstruction is bounded by the 335° vector, on one hand, and the 25° vector, on the other, the antenna 32 passing through its zero reference point during the time when this last obstruction is appearing on the screen. It is now necessary that these established vector boundries be utilized in the construction of a plurality of rotary switch assemblies which are shown in FIG. 10 of the drawing and respectively identified by the reference characters A, B and C. The switch assembly A is designed to rotate about a pivot shaft 92, with the other rotary switch assemblies B and C respectively possessing pivot shafts 94 and 96. All three of these shafts 92, 94 and 96 are rototed by a mechanical connection to the synchro 98 of FIG. 9 which operates in synchronism with the rotation of the antenna unit 32 of FIG. 8 through a connection to the antenna drive motor 37 of this latter figure. The three rotary switch assemblies of FIG. 10, therefore, are driven in unitary fashion with the antenna 32, and are arranged to possess a zero reference point identical to that of the cathode-ray tube display of FIG. 7.

When the radar operator has discovered the azimuthal boundries of the obstructions which produce the indications 30, the switch assemblies A, B and C of FIG. 10 are configured so that the switch assembly A is closed only during that portion of each rotational cycle lying within the angular limits of 43° and 60°. In corresponding fashion, the rotary switch member B is configured so that it closes a circuit during that portion of each cycle within the angular limits of 165° and 235°. The rotary switch C closes between 335° and 25° of the cycle, these closing times corresponding to the boundaries of the sectors in FIG. 13 within which the obstructions 30 lie.

As shown in FIG. 10, each of the shafts 92, 94 and 96 is connected to one terminal of a source of potential. The switch assembly A incudes a stationary contact 99 leading to an "and" gate 100, while the switch assembly B has a stationary contact 102 leading to a further "and" gate 104. In similar fashion, the switch assembly C incorporates a stationary contact 106 which leads to a still further "and" gate 108. Such stationary contacts 99, 102 and 106 lie at the zero reference point in each rotational cycle of the switches A, B and C. Each of these gates 100, 104 and 108 lies in a separate channel, the gate 100 having applied thereto the output of a multivibrator D, the gate 104 receiving the output of a multivibrator E, and the gate 108 receiving the output of a multivibrator F. It will be subsequently shown that the switch assemblies A, B and C develop output pulses indicative of the azimuthal characteristics of the stationary obstructions while the multivibrators D, E and F respectively develop further output pulses representative of the range characteristics of these obstructions. Each of the "and" gates 100, 104 and 108 receives a pulse from one of the rotary switch assemblies A, B and C as well as a pulse from one of the multi-vibrators D, E and F. When these pulses coincide in time, they are passed by the gate and flow through a further "or" gate 110 to reach the unit 54 of FIG. 8. This enables the radar to block the spurious energy picked up by the horn 46 during those time periods when the proper azimuthal and range characteristics of each such obstruction are present.

The three rotary switch assemblies A, B and C of FIG. 10 consequently determine those particular time periods when the gating unit 54 of FIG. 8 is closed insofar as the azimuthal characteristics of the obstructions which produce the indications 30 are concerned. It is also necessary to determine the range aspects of these obstructions, and this is carried out by generating a series of output pulses from the multivibrators D, E and F. The multivibrators are of the so-called "one-shot" type, and the leading edge of each output pulse produced thereby is controllable in time by the radar operator through the manual manipulation of an adjustable component which forms part of each assembly. Inasmuch as the range depth of each stationary obstruction is different from that of each of the other obstructions, provision must also be made for regulating the width of each of the pulses developed by the respective multivibrators. This is brought about by utilizing a separate width control unit associated with each multivibrator, as shown in FIG. 10. The operation of each multivibrator is synchronized with the production of pulses by the transmitter 70 of FIG. 9 through the application to each multivibrator of a range trigger pulse, such pulse being present in the conductor 111.

Figure 12:
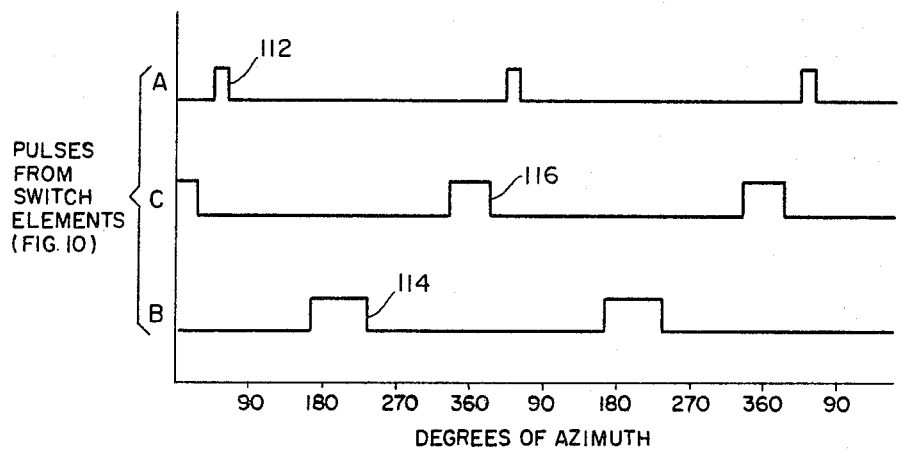
FIG. 12 is a further set of waveforms indicating the periods of operation of the gating elements of FIG. 10 insofar as they are synchronized with the operation of the antenna of FIG. 8.

FIGS. 11 and 12 illustrate waveforms of representative pulses respectively produced by the multivibrators and rotary switches, respectively, of FIG. 10. From this latter figure it will be seen that the rotary switch assembly A is associated with the multivibrator D, and that the respective outputs of these units are applied to the "and" gate 100. The rotary switch assembly B is similarly associated with the multivibrator E, the respective outputs of these members being applied to the "and" gate 104. In like fashion, the switch assembly C and the multivibrator F have their respective outputs applied to the "and" gate 108.

From FIG. 7, it will be seen that a particular indication 30 lies between the vector coordinates represented by 43° and 60°. As shown in FIG. 10, the switch assembly A is configured to produce an output pulse during this portion of each rotary cycle. Such an output pulse is designated by the reference numeral 112 in FIG. 12. Such pulse is applied to the "and" gate 100 of FIG. 10. A further area of the display of FIG. 7 which is affected by reflections from stationary obstructions lies between the boundaries designated by the vector coordinates 165° and 235°. The switch assembly B of FIG. 10 is configured to produce an output pulse during this portion of each rotary cycle, this pulse being identified by the reference numeral 114 in FIG. 12. This pulse 114 is applied to the "and" gate 104 along with the output of the multivibrator E. In similar fashion, the final one of the three areas 30 of FIG. 7, is bounded by the vector coordinates 335° and 25°. The switch assembly C is designed to be closed during this portion of each cycle and produces a pulse 116 which is applied to the "and" gate 108 along with the pulse output of the multivibrator F. As a consequence of this arrangement, the gates 100, 104 and 108 respectively receive pulse energy during the desired azimuthal blanking periods. It is now only necessary to take into account the range characteristics of these various obstructions, and this is initially accomplished by the radar operator while viewing the P.P.I. display.

From FIG. 7 it will be seen that one of the stationary objects which produces the illuminated area lying between the vector coordinates 43° and 60° also lies within a range having a minimum distance from the radar antenna represented by the broken line 118 and a maximum distance represented by the broken line 120. In order to preclude the passage of energy from the middle beam horn 46 to the auxiliary MTI receiver 66 during the time period when reflections are being received by the antenna over this particular range, the multivibrator D and its associated components must operate to produce an output during this time interval. In other words, the output of the multivibrator D must be selected so that a pulse of the type identified by the reference numeral 122 in FIG. 11 is developed. This pulse 122 must be initiated at that particular time instant during each pulse repetition cycle corresponding to the location of the broken line 118 of FIG. 7, this consequently, the radar operation adjusts the control dial 124 of the multivibrator D while viewing the presentation of FIG. 7 until the leading edge 126 of the pulse 122 coincides with the location of the broken line 118. Since it is only desired to block the passage of energy through the gating unit 54 of FIG. 8 while the illuminated area 30 is being developed, the blanking output of the range control circuit should be terminated at a time instant when the scanning beam reaches the location of the broken line 120 in FIG. 7. The operator achieves this control over the blanking action by manipulating a further knob 128 forming part of the pulse-width-control unit 130. This has the effect of producing the trailing edge 132 of the pulse 122 and terminating the application of energy therefrom to the "and" gate 100.

The multivibrator E has an adjustable control 134 which the radar operator manipulates to develop the leading edge 136 of the output pulse 138. The trailing edge 140 of this pulse is determined by the manual actuation of the dial 142 which forms part of the width-control network 144.

Associated with the rotary switch element C is a multivibrator 145 having a control dial 146 by means of which the radar operator can determine the time of accurance of the leading edge 147 of its output pulse 148. The trailing edge 150 of this pulse is produced by the width-control circuit 152 when the radar operator manipulates the dial 154.

The respective outputs of the "and" gates 100, 104 and 108 are applied to the further gate 110 which is of the "or" type. The resulting output of the gate generator 78 is that which reaches the gating unit 54 of FIG. 8 over the conductor 68. It should be noted that the various "and" gates 100, 104 and 108 only pass energy during the concurrent application thereto of a pulse from one of the switch assemblies A, B and C *and* one of the multivibrators D, E and F.

FIGURE 14 of the drawing represents those areas in which the auxiliary MTI receiver is precluded from receiving energy from the middle-beam horn 46 of FIG. 8. In consequence of this action, the effect of spurious indications which appear in FIG. 7 are either eliminated entirely or greatly reduced.

The number of "channels" employed in the arrangement of FIG. 10 is of course dependent upon the number of stationary obstructions which are discovered to be present in the signal return in the area that the radar apparatus is initially set up. It will be recognized that there is no limit on the number of such "channels" that may be employed except as dictated by practical considerations. Once the radar operator has adjusted the various controls 124, 128, 134, 142, 146 and 154 there should be no further need for any attention on his part insofar as this aspect of the radar operation is concerned, since the obstructions and terrain variations are of a stationary character and the reflections therefrom do not change in either range or azimuth from one period of operation of the radar to another.

Obviously many modifications and variations of the present invention are possible in the light of the above teachings. It is therefore to be understood that within the scope of the appended claims the invention may be practiced otherwise than as specifically described.

I claim:

1. In a radar indicator system for yielding a cyclically-revised visual presentation of the position of at least one moving target lying within a generally predetermined region in space, in which system the desired presentation of such moving target is subject to degradation by the reflection of electromagnetic energy from at least one stationary object lying within the said predetermined spatial region, the improvement which comprises:

means for reducing the effect in such presentation of the reflections from such stationary object by inhibiting the passage through such radar system of the electromagnetic energy representative thereof, said means including;

a directive antenna designed for cyclic rotation in a generally horizontal plane, said antenna having a reflector and a first feed horn acting both to transmit and receive electromagnetic energy;

a second feed horn for said antenna, said second feed horn being positionally displaced from said first horn in a generally vertical direction, said second feed horn acting to receive electromagnetic energy transmitted by said first horn and reflected from objects including said stationary object;

each of said feed horns having a particular radiation pattern, the pattern of said second horn being vertically offset with respect to the pattern of said first horn so that different spatial regions are covered thereby, said stationary object lying within the radiation pattern of said second horn and from which reflections are received by said antenna which tend to degrade the said presentation;

means for energizing said first horn;

a radar receiver to which the respective signals reflected back to both said horns are applied;

means for gating the output of said second horn during those time instants when reflections from a stationary object lying within the radiation pattern thereof are being picked up by said antenna, so that no energy is applied to said receiver during such time instants, while the energy picked up by said first horn continues to be applied to said receiver;

means forming part of said receiver for separately processing the respective energies received thereby from each of said horns;

means also forming part of said receiver for combining the signals thus separately processed; and means for presenting the signals thus combined.

2. In a radar system of the MTI type, such system including means for visually presenting to an operator the instantaneous position of a moving target lying within the region covered thereby, such region also including at least one stationary object from which energy transmitted by the radar is reflected and picked up by the antenna of said radar along with the reflections from said moving target, the energy reflected from such stationary object acting to develop a condition in the visual presentation of such radar that tends to degrade the indication produced by said moving target and thus renders detection of the target difficult, the improvement which comprises materially reducing the effects resulting from the reception of energy from such stationary object, said means including;

a plurality of individual horn elements associated with the antenna of said radar system;

means for energizing one of said horn elements to produce a series of pulses for transmission toward said moving target, from which target electromagnetic energy is reflected to be picked up by both said horn elements;

said radar system incorporating a pair of receiving channels respectively associated with said horn elements;

means for applying the respective energies picked up by said energizable elements separately to the said channels so that the signals received by said horns are individually processed;

gating means associated with one of said channels for blocking the passage through said one channel of energy received by the horn associated with such channel only during those particular periods of time when the energy picked up by such horn includes reflections from said stationary object;

such means for blocking the passage of energy from said last-mentioned horn including means for coordinating such blocking intervals with both the azimuthal and range characteristics of the stationary object from which such reflections are received.

3. In an MTI receiver adapted to acquire and/or track a moving target under conditions where the visual presentation of such target on the screen of the receiver's cathode-ray tube is subject to being obscured by conditions produced by spurious reflections from stationary objects lying within the range of the radar, the combination of:

an antenna structure designed for cyclic rotation in a generally horizontal direction so as to produce one complete azimuthal scan during each cycle of rotation thereof;

said antenna including three energizable elements positionally displaced from one another in a generally vertical direction such that each such energizable element is associated with a distinct radiation pattern and with each such pattern being vertically offset from the remaining patterns so as to cover a distinct spatial region;

means for energizing one of said elements so as to transmit time-spaced pulses from said antenna in the general direction of said moving target, from which target energy is reflected back to said antenna to be intercepted by those particular energizable elements within the respective radiation patterns of which such moving target lies, the energy transmitted from the said one energizable element also being reflected by a stationary object located within that particular radiation pattern which lies intermediate the remaining two patterns considered in a vertical direction, the said stationary object also lying within the lowermost one of the three said radiation patterns;

a pair of signal detecting and demodulating channels forming part of said radar system;

a connection between one of such signal detecting and demodulating channels and that particular one of said energizable antenna elements which is associated with the lowermost one of the said radiation patterns;

means for combining the respective outputs of the remaining two energizable elements associated with the intermediate radiation pattern and the uppermost one of such patterns, respectively;

a connection between such combining means and the remaining one of the two signal detecting and demodulating channels of said system;

a network for adding together the respective outputs of the two receiver channels;

an indicator to which the signals so added are applied; and means for precluding the passage through said combining unit of energy picked up by that energizable element of said antenna associated with the said intermediate radiation pattern only during that particular time period when such energy contains reflections from the stationary object lying within such intermediate radiation pattern;

whereby the effect of the energy thus reflected from said stationary object is materially reduced, as a result of which the contrast between the indication produced by the moving target and the overall illumination of the cathode-ray tube screen is improved.

4. The combination of claim 3, in which the means for precluding passage of energy through said combining unit during particular periods of time includes means for producing a blanking signal the occurance and duration of which are functions of the azimuthal direction of the said stationary object and of the distance from said antenna at which the said object is located.

5. The combination of claim 4, in which the means for producing a blanking signal includes a switch member designed for concurrent cyclic rotation with said antenna, said switch element being arranged to develop a voltage output during each rotational cycle of said switch when the antenna is subtending a sector having vectorial coordinates lying to either side of the stationary object from which the reduction of reflections to said radar is desired.

6. The combination of claim 5, in which the said means for producing a blanking pulse also includes a multivibrator designed to produce an output pulse;

means for manually controlling the time instant at which such multivibrator output pulse is initiated, so that such time instant is a function of the minimum range or distance of said stationary object from said antenna; and further means for controlling the instant of occurance of the trailing edge of such multivibrator output pulse so that it is a function of the maximum range or distance of such stationary object from said antenna.

7. The combination of claim 6, further including:

an "and" gate adapted to receive the voltage pulse produced by said rotary switch and the pulse output of said multivibrator, such "and" gate acting to pass therethrough energy only during the concurrent reception thereby of pulses from both said switch and said multivibrator;

the output of said "and" gate being applied to said combining unit to periodically block the passage therethrough of the spurious signals picked up by the energizable element associated with the said intermediate radiation pattern.

References Cited by the Examiner

UNITED STATES PATENTS 2,532,566  12/1950  Millman _____ 343—11 X

CHESTER L. JUSTUS, *Primary Examiner.*

RODNEY D. BENNETT, *Examiner.*